(No Model.)

W. G. LENKER.
WEIGHING SCALE.

No. 573,015. Patented Dec. 15, 1896.

Witnesses
Jno. G. Hinkel
William E. Neff

Inventor
Will G. Lenker
by Watson & Watson
Attorneys

THE NORRIS PETERS CO., PHOTO-LITHO., WASHINGTON, D. C.

UNITED STATES PATENT OFFICE.

WILL G. LENKER, OF SUNBURY, PENNSYLVANIA.

WEIGHING-SCALE.

SPECIFICATION forming part of Letters Patent No. 573,015, dated December 15, 1896.

Application filed January 25, 1896. Serial No. 576,775. (No model.)

*To all whom it may concern:*

Be it known that I, WILL G. LENKER, a citizen of the United States, residing at Sunbury, in the county of Northumberland and State of Pennsylvania, have invented certain new and useful Improvements in Weighing-Scales, of which the following is a specification.

My invention relates to improvements in that class of weighing-scales known as "balances."

The object of my invention is to provide a scale which can be quickly set to weigh any desired amount within the capacity of the machine and in which the liability to error through carelessness in reading the scale will be reduced to a minimum.

To these ends the invention consists in a beam-scale having a series of weights or poises normally seated beneath and disconnected from the beam and a series of pick-up devices movably mounted upon the beam and so constructed that when any one of them is operated it will elevate its corresponding poise. These pick-up devices are each constructed to interlock with the beam when in its elevated position and to hold its poise suspended by the beam until the pick-up is released. The poises beneath the beam usually correspond to the even pounds and the principal fractions of a pound. For weighing with greater nicety I combine with the beam a sliding poise which may be set at any fraction of an ounce. In using the scale the amount required upon the platform or pan to balance the beam will be equal to the sum of the quantities indicated by the sliding poise and the poise or poises lifted by the pick-up devices. The pick up devices are provided with tablets upon which the corresponding amounts may be printed in large figures, thereby enabling the operator to readily read the amount for which the scale is set and preventing mistakes which are commonly made by errors in reading the small figures upon scale-beams.

Figure 1:
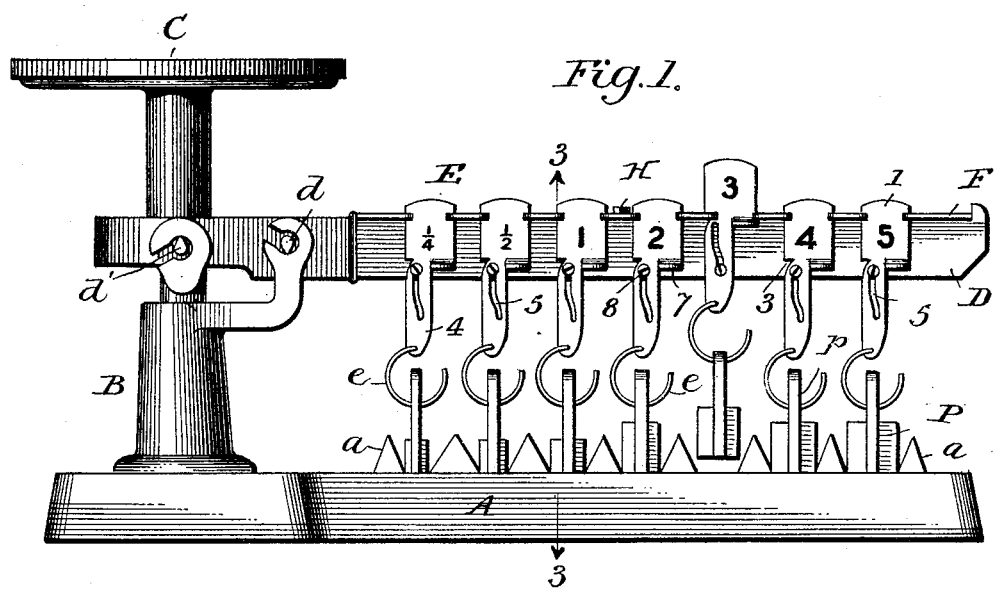
Figure 2:
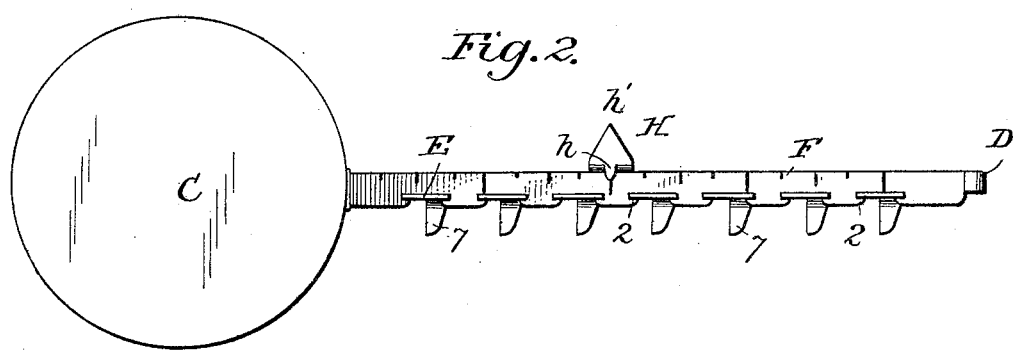
Figure 4:
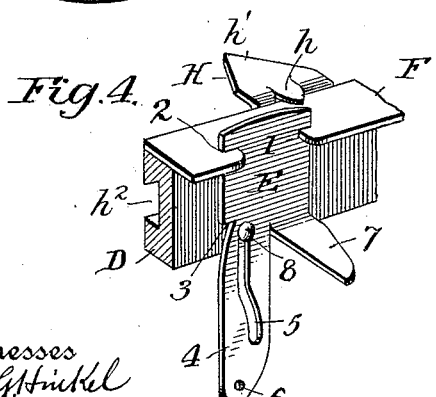
Figure 3:
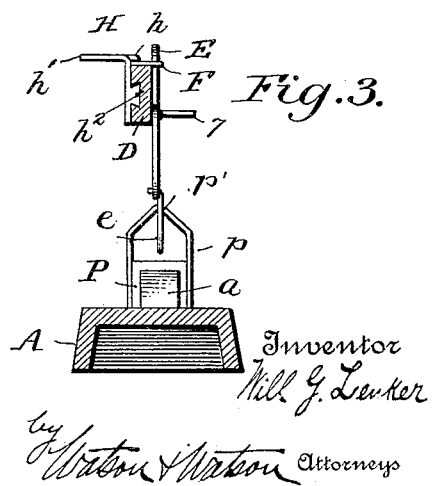

In the accompanying drawings, which form a part of this specification, Figure 1 is a side view of a balance constructed according to my invention. Fig. 2 is a plan view of the same. Fig. 3 is a vertical section on the line 3 3 of Fig. 1, and Fig. 4 is a perspective view of a portion of the scale-beam.

Referring to the drawings, A indicates the base, B the standard, and C the pan, of a balance. These parts may be of any desired construction. As shown, the base is extended to form a support for the poises. In other forms of scales, such as platform-scales, the poises may be supported by a suitable bracket or shelf. The beam D is provided with the usual knife-edges $d$, which rest in bearings upon the standard, and with knife-edges $d'$, which carry the scale-pan. Beneath the scale-beam and normally resting upon the base or other suitable support are a series of poises P, each provided with means whereby it may be raised and suspended from the beam. As shown, the poises each carry a bail $p$ of considerable height and having a central angle $p'$ at the top. In order that the poises may always rest in the same position, I provide angular guides $a$, which are fixed upon the support for the poises and serve to guide them and direct them to their proper places when they are lowered.

Upon the scale-beam D is mounted a series of pick-up devices E. As shown, these devices consist of sheet-metal plates mounted to slide vertically upon the side of the beam. The upper portion 1 of the pick-up consists of a rectangular tablet which slides vertically in an opening 2 in the projecting edge of a plate F upon the top of the beam. This body portion 1 of the pick-up forms a tablet, upon which the weight to which it corresponds may be marked by a conspicuous figure. At the base of the body 1 is a notch 3, which hooks over and rests upon the plate F when the pick-up is raised. Beneath the notch 3 and on the same side there is a downward extension 4 of the plate, having an inclined slot 5, the slot being nearly vertical and having its lower end inclined to the right a distance approximately equal to the depth of the notch 3, so that the pick-up will be vertical when latched up. Slightly to the left of the lower end of the slot 5 is a perforation 6, in which is hung a curved loop $e$, the loop forming a hook or ring which passes through the bail $p$ of the poise P below the pick-up. To the right of the extension 4 is a second extension 7, which is shorter and bent outward to form a key or handle by which the pick-up may be raised. A headed pin or screw 8 passes through the slot 5 into the beam and serves to guide the lower portion of the pick-up, as will be hereinafter explained.

A sliding poise H is mounted in a suitable guide in the beam, so that it may be set at any point of a scale which is laid out upon the upper plate F of the beam. As shown, this scale is graduated for ounces and fractions of an ounce, and the sliding poise is provided with a pointer $h$, which travels over the scale, and an extension $h'$, which may be used as a handle for setting the poise. The poise is mounted in a suitable guide $h^2$ upon the beam, which, as illustrated in Figs. 3 and 4, is undercut or dovetailed in form.

The operation of the invention is as follows: When it is desired to weigh a certain amount, say three pounds, the sliding poise is set at "0," and the pick-up numbered "3" is raised by lifting the key 7 with the finger until the notch 3 engages the plate F. The depending loop $e$ will lift the poise into the position shown in Fig. 1, where it will hang free in space. As the operator lifts the key on the right side of the pick-up the weight of the poise, which is hung on the left side, will cause the upper end of the pick-up to tend to swing to the left, and as soon as the notch 3 reaches the plate E the pick-up will swing to the left and the upper wall of the notch will rest on the plate. Further upward movement will be prevented by the pin 8 coming in contact with the bottom of the slot 5. While the pick-up is being raised the key may be said to be fulcrumed upon the finger of the operator. After the finger is taken away the upper portion of the pick-up still has a tendency to swing to the left, due to the fact that the weight of the poise is connected at the point 6 to the left of the pin 8, the pin in this instance being the fulcrum-point. There will therefore be a tendency in the pick-up to remain engaged with the plate F. After the weighing operation is completed the poise is again dropped by simply touching the tablet or upper end of the pick-up and moving it slightly to the right to disengage the notch from the plate. It will be seen that when any poise is selected the tablet upon its corresponding pick-up is exhibited conspicuously above the beam, and mistakes can only be made by gross carelessness.

The scale may be used to weigh any amount up to the sum of the amounts corresponding to all of the poises. As shown in the drawings, the poise in highest value will weigh five pounds. To weigh eight pounds, it is simply necessary to raise the five and three pound poises. To weigh ten pounds, the two-pound poise should be added also, &c. In the illustration the scale on the beam is divided into but four ounces, and small fractions of an ounce can therefore be weighed. Any amount above four ounces can be weighed by using the poises beneath the beam.

It will be evident that various changes in the details of construction of the parts embodying the invention may be made without departing from the scope and spirit thereof.

Without limiting myself to the precise construction and arrangement illustrated and described, I claim—

1. The combination with a scale-beam, of a series of poises, a fixed support for said poises below the beam, and independently-movable devices constructed to lift said poises separately into engagement with the beam and to lower them onto said fixed support, substantially as described.

2. The combination with a scale-beam, and a series of poises supported below said beam, of a corresponding series of independently-movable pick-up devices arranged upon the beam, whereby the poises may be lifted into engagement with the beam, substantially as described.

3. The combination with a scale-beam, and a series of poises supported beneath the said beam, of a corresponding series of pick-up devices independently movable and supported upon the beam, each pick-up being disengaged from its poise when in its inoperative position, and having connections for engaging and raising its poise when it is rendered operative, substantially as described.

4. The combination of a scale-beam, a series of poises, and a corresponding series of independently-movable pick-up devices upon the beam, said devices having panels or spaces numbered to indicate the weights to which they correspond, substantially as described.

5. The combination with a scale-beam, and a series of poises, of a corresponding series of pick-up devices mounted upon the beam and vertically movable thereon, finger-keys for lifting said devices, and notches or shoulders on said devices for holding them in their raised position, substantially as described.

6. The combination of a scale-beam, a series of poises and a corresponding series of pick-up devices, each device having a notch for latching it when raised, and a diagonal guide-slot arranged to hold it in a perpendicular position when down and also when the notch is engaged with the scale-beam, substantially as described.

7. The combination with a scale-beam, and a series of poises upon a stationary support, said poises being provided with bails, of a series of movable pick-up devices mounted upon the beam, said pick-up devices having loops which hang within and free from the bails of the poises when the pick-ups are inoperative, and which engage the bails and raise the poises when the pick-ups are operated, substantially as described.

8. The combination with a scale-beam, a series of poises upon a fixed support, and a corresponding series of pick-up devices carried by the beam and independently movable thereon, of a scale on said beam, and a poise mounted on and adapted to slide along said beam and to be set by said scale, substantially as described.

9. The combination with the scale-beam, having guides, and the series of poises, of the vertically-movable pick-up devices mounted in said guides upon the beam and each consisting of a sheet-metal plate having a tablet to receive the weight-figure, a notch upon one side, an outwardly-bent extension upon the other side to form a finger-key, and a depending loop to engage a poise, substantially as described.

In testimony whereof I affix my signature in presence of two witnesses.

WILL G. LENKER.

Witnesses:
D. E. LENKER,
J. HARRIS LENKER.